US008782691B1

(12) United States Patent
Noble et al.

(10) Patent No.: US 8,782,691 B1
(45) Date of Patent: Jul. 15, 2014

(54) TIME SHIFTED TARGETED ADVERTISEMENTS BASED UPON USER PROFILES

(75) Inventors: Taber B. Noble, Palos Verdes Estates, CA (US); Gary M. Lehto, Palos Verdes Estates, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 2752 days.

(21) Appl. No.: 10/046,841

(22) Filed: Jan. 15, 2002

(51) Int. Cl.
*H04N 21/258* (2011.01)
*H04N 21/2668* (2011.01)
*H04N 21/432* (2011.01)
*H04N 21/44* (2011.01)
*H04N 21/45* (2011.01)
*H04N 21/466* (2011.01)

(52) U.S. Cl.
CPC ...... *H04N 21/25891* (2013.01); *H04N 21/2668* (2013.01); *H04N 21/4325* (2013.01); *H04N 21/44016* (2013.01); *H04N 21/4532* (2013.01); *H04N 21/4667* (2013.01)
USPC .............................. 725/34; 725/14; 725/116

(58) Field of Classification Search
USPC .................................. 725/32–36, 8
See application file for complete search history.

(56) References Cited

U.S. PATENT DOCUMENTS

| 5,155,591 | A | 10/1992 | Wachob |
| 5,446,919 | A | 8/1995 | Wilkins |
| 5,515,098 | A | 5/1996 | Carles |
| 5,636,346 | A | 6/1997 | Saxe |
| 5,652,615 | A | 7/1997 | Bryant et al. |
| 5,661,516 | A | 8/1997 | Carles |
| 5,774,170 | A | 6/1998 | Hite et al. |
| 5,874,985 | A | 2/1999 | Matthews, III |
| 5,880,768 | A | 3/1999 | Lemmons et al. |
| 5,886,731 | A | 3/1999 | Ebisawa |
| 6,002,393 | A | 12/1999 | Hite et al. |
| 6,005,565 | A | 12/1999 | Legall et al. |
| 6,029,045 | A | 2/2000 | Picco et al. |

(Continued)

FOREIGN PATENT DOCUMENTS

| EP | 0963109 | 12/1999 |
| WO | 9713368 | 4/1997 |

(Continued)

OTHER PUBLICATIONS

Michael Robin et al., *Digital Television Fundamentals—Design And Installation Of Video And Audio Systems*, McGraw-Hill, Chapter 8, title page(s) and pp. 345-425.

(Continued)

*Primary Examiner* — Bennett Ingvoldstad

(57) ABSTRACT

Methods and systems for time shifting advertising to provide enhanced advertisement targeting are presented. An exemplary method of time shifting advertising of a video service comprises generating a private profile based upon a private play history of a receiver and receiving one or more predetermined advertisements, each of the one or more advertisements including meta data. The profile can be generated by a profiler within a receiver unit. The predetermined advertisements are selected and stored based upon the meta data and the private profile. A program is received and a targeted advertisement is selected from the subset of the predetermined advertisements based upon the meta data and the private profile and played with the program. Management of the advertisements (e.g. selecting and storing predetermined advertisements and selecting targeted advertisements) can be facilitated by an advertisement controller within the receiver.

18 Claims, 9 Drawing Sheets

(56) References Cited

U.S. PATENT DOCUMENTS

| | | | |
|---|---|---|---|
| 6,075,575 A | 6/2000 | Schein et al. | |
| 6,084,628 A | 7/2000 | Sawyer | |
| 6,160,570 A | 12/2000 | Sitnik | |
| 6,177,931 B1 | 1/2001 | Alexander et al. | |
| 6,219,839 B1 | 4/2001 | Sampsell | |
| 6,233,389 B1 * | 5/2001 | Barton et al. | 386/46 |
| 6,268,849 B1 | 7/2001 | Boyer et al. | |
| 6,330,610 B1 * | 12/2001 | Docter et al. | 709/229 |
| 6,463,585 B1 * | 10/2002 | Hendricks et al. | 725/35 |
| 6,698,020 B1 * | 2/2004 | Zigmond et al. | 725/34 |
| 6,718,551 B1 * | 4/2004 | Swix et al. | 725/32 |
| 2001/0003845 A1 * | 6/2001 | Tsukamoto et al. | 725/8 |
| 2002/0129362 A1 * | 9/2002 | Chang et al. | 725/32 |

FOREIGN PATENT DOCUMENTS

| | | |
|---|---|---|
| WO | 99/65242 A1 | 12/1999 |
| WO | 0021287 A1 | 4/2000 |
| WO | 0110115 A1 | 2/2001 |

OTHER PUBLICATIONS

EPO Communication dated Nov. 29, 2010 in European Patent Application No. 01128048.4 filed Nov. 26, 2001 by Taber B. Noble.

EPO Summons to oral proceedings dated Sep. 7, 2012 in European Patent Application No. 01128048.4 filed Nov. 26, 2001 by Taber B. Noble.

* cited by examiner

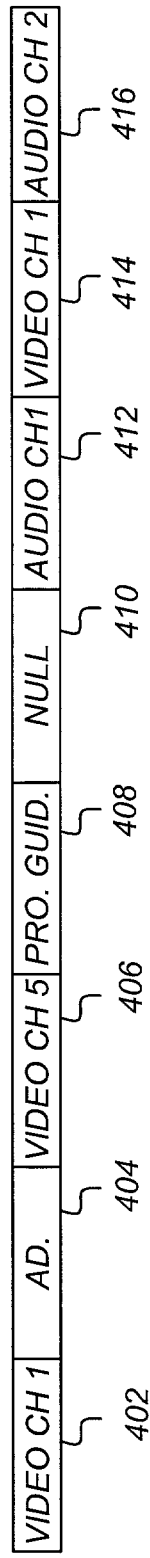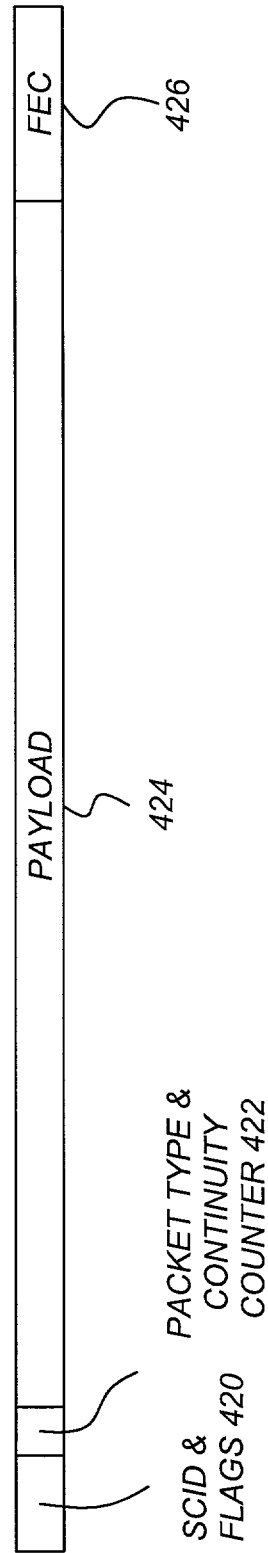
FIG. 4A
FIG. 4B

TIME SHIFTED TARGETED ADVERTISEMENTS BASED UPON USER PROFILES

BACKGROUND OF THE INVENTION

1. Field of the Invention

The present invention relates to systems and methods for presenting advertising to viewers, and in particular to a method and apparatus for presenting time shifted advertising to media subscribers.

2. Description of the Related Art

Advertising is a ubiquitous element of most video services. Advertisements and promotions for products are blended with broadcast and cable television programming. Newer video services such as direct satellite service (DSS) and Internet video are following suit. Advertising can provide a significant (if not only) source of revenue for a video service provider.

Ideally advertising is targeted to a particular group or demographic of consumers. Generally, advertisers attempt to identify the most receptive group of consumers for their product and spend money to present ads and promotions to them. Thus, the advertising efficiency is maximized. For example, if an advertiser has a thousand flyers printed to promote a new scooter, he should expect a much better response if the ads are distributed at a junior high school than if they are distributed at a nursing home. Similarly, if the selected media is conventional television, the advertiser would prefer to advertise the scooter during a Saturday morning cartoon rather than an afternoon soap opera.

What program is being played may be the strongest available indicator of the demographic that will be watching when the advertisement is played. Identifying the demographic associated with the viewership of a particular show is important to identify the products which will benefit most from having associated advertisements.

When a program is viewed is also an important factor in identifying particular demographic groups. For example, it might be reasonable to assume that daytime television viewers (i.e. "daypart" viewers) comprise a higher percentage of homemakers and the unemployed than prime time viewers; advertisements for cleaning products and job training would be targeted to these groups. The principle of demographic correlation to viewing times is more fully discussed in U.S. patent application Ser. No. 09/818,230, filed Mar. 27, 2001 by Taber B. Noble and entitled "DAYPART BASED NAVIGATION PARADIGM", which application is incorporated by reference herein.

Obviously, the viewer numbers are also an important consideration. The value of a particular advertising spot is based in part upon the number of people who will see it; more viewers indicates a higher number of receptive consumer viewers, regardless of the demographic breakdown. However, the non-receptive viewers who end up watching a particular advertisement could be watching another ad (for a product that they are receptive to). This indicates an aggregated advertising inefficiency. In addition, the difficulty with broadcast media is determining just how many viewers actually see the program and associated advertisement, even before analyzing the possible demographic components of the audience. When one thousand flyers are distributed one knows that nearly one thousand people will see the flyer. In contrast, when a commercial is broadcast it is uncertain exactly how many people will actually see it. Estimates are made based upon the popularity of the program associated with the advertisement and other factors. These numbers can then be confirmed based upon statistical studies. Some related exemplary systems and methods to facilitate effective advertisement delivery follow.

U.S. Pat. No. 6,029,045 to Picco et al., which is incorporated by reference herein, describes a system for communicating a programming data stream and a data stream containing pieces of local content data that are going to be inserted into a local content space in the programming data stream at some predetermined time in which the programming data stream and the local content digital data stream are transmitted to a set-top box in a house of a user. The set-top box stores a predetermined portion of the pieces of local content data based on predetermined criteria, and the set-top box identifies a local content space in the programming data stream. The set-top box may also select a particular piece of local content from the storing system to insert into the local content space in the programming data stream based on a plurality of predetermined preferences of the user, retrieve that selected piece of local content from said storage means, and insert that selected piece of local content into said programming data stream at said local content space so that individualized local content specific to the user of the set-top box is inserted into the programming data stream.

U.S. Pat. No. 5,886,731 to Ebisawa, which is incorporated by reference herein, describes a video data receiving apparatus that displays the program video inserted the CM video with the desired timing and the desired form based on the demand of viewers. A video data transmitting apparatus transmits the CM data and the program data to display the program video being inserted the CM video with desired form on the receiving apparatus. A broadcasting system wherein the program video inserted the CM video with the form based on the demand of the viewer are displayed on the receiving side is disclosed.

U.S. Pat. No. 5,774,170 to Hite et al., which is incorporated by reference herein, describes enhancing television (and radio) advertising by targeting, delivering and displaying electronic advertising messages (commercials) within specified programming in one or more pre-determined households (or on specific display devices) while simultaneously preventing a commercial from being displayed in other households or on other displays for which it is not intended. Commercials can be delivered to specified homes or displays via either over-the-air or wired delivery systems.

U.S. Pat. No. 6,002,393 to Hite et al., which is incorporated by reference herein, describes a system and method for targeting TV advertisements to individual consumers delivering a plurality of advertisements to a display site. A command signal is sent to the display site commanding the display of a selected advertisement suited for the individual consumer. In another embodiment, a predetermined advertisement is delivered upon command from a control center to a viewing site intended for the particular consumer.

Significant effort has been expended in improving advertisement targeting. However, unfortunately, many systems and methods for improved advertisement targeting require additional information about the potential viewer. Many systems may supply detailed and personal information concerning viewing habits to a service provider without the understanding or consent of the viewer. Consequently, there is a need for systems and methods which improve the ability to appropriately target consumers with advertisements without requiring a release of private information.

The value of advertising is traditionally based upon estimates of viewer numbers and further estimates of the subset of receptive consumers among those numbers. Advertising is more efficient when more of the total viewers are receptive to the advertisement. There is a need for systems and methods that provide more efficient advertising. Furthermore, as a result of the errors in estimating, advertisers may end up paying too much or too little for a group of receptive consumers to view their advertisements. There is also a need for systems and methods to develop accurate advertisement pricing information.

In addition, traditionally both the pricing and presentation of advertisements is strictly tied to the presentation of particular programs. However, the real objective is for the advertisements to be viewed by receptive consumers in a manner which improves the probability of a purchase. There is a need for pricing and presentation systems and methods that are more directly based associated with the viewing of particular advertisements by receptive consumers. There is also a need for methods of presenting advertisements to receptive customers such that improves the probability of a product purchase.

Furthermore, advertisements are traditionally selected individually for a given slot based upon the assumption that the advertisement will be viewed when the associated program is transmitted (identifying a demographic by viewing time as previously described). However, programs may be recorded and played at various times, making the assumption inaccurate. There is a need for systems and methods which accommodate the time shifting of program playback.

The present invention meets all the foregoing needs.

SUMMARY OF THE INVENTION

To address the needs described above, the present invention discloses systems and methods for presenting advertising to media subscribers. An exemplary method of time shifting advertising of a video service comprises generating a private profile based upon a private play history of a receiver and receiving one or more predetermined advertisements, each of the one or more advertisements including meta data. The profile can be generated by a profiler within a receiver unit. The predetermined advertisements are selected and stored based upon the meta data and the private profile. A program is received and a targeted advertisement is selected from the subset of the predetermined advertisements based upon the meta data and the private profile and played with the program. Management of the advertisements (e.g. selecting and storing predetermined advertisements and selecting targeted advertisements) can be facilitated by an advertisement controller within the receiver.

The predetermined advertisements can be determined from a shared profile either within the receiver or at the service provider. The shared profile can be based upon a shared play history of the receiver to preserve viewer privacy. The shared profile can be directly reported from a receiver or a shared play history of the receiver can be reported to a service provider and used to generate the shared profile. Using this, viewers can select a level of privacy, perhaps based upon discount, contest entry or other incentives.

The targeted advertisement can also be based upon a viewer election to view the targeted advertisement. For example, viewer election can be based upon pricing of the program or some other promotional incentive.

The invention can also report a status of the playing of the targeted advertisement. The price of advertising can be directly based on the reported status. The meta data used with the advertisements can comprise many information categories, such as an advertisement source, duration, type and time position, a regional identifier and an expiration within the program. For example, selecting and storing the subset of predetermined advertisements can be based upon a regional identifier. In addition, selecting the targeted advertisement can be based upon an expiration of the advertisement.

Furthermore, selecting the targeted advertisement can be based upon a time of day that the program is played. The targeted advertisement can also be selected based upon one or more previous viewings of the program. Advertisement pricing can be based upon identifying premiere or rerun viewings. Using this basis, advertisements can also be ordered to appear in a predetermined sequence regardless of changes in program selection by the viewer.

Finally, the present invention can be used to play advertisements with a program that is received and played in real time or one that is recorded and played from the recording.

BRIEF DESCRIPTION OF THE DRAWINGS

Referring now to the drawings in which like reference numbers represent corresponding parts throughout:

FIG. 4A is a diagram of a representative data stream comprising a series of data packets received from a satellite;

FIG. 4B is a diagram illustrating the structure of an individual data packet;

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
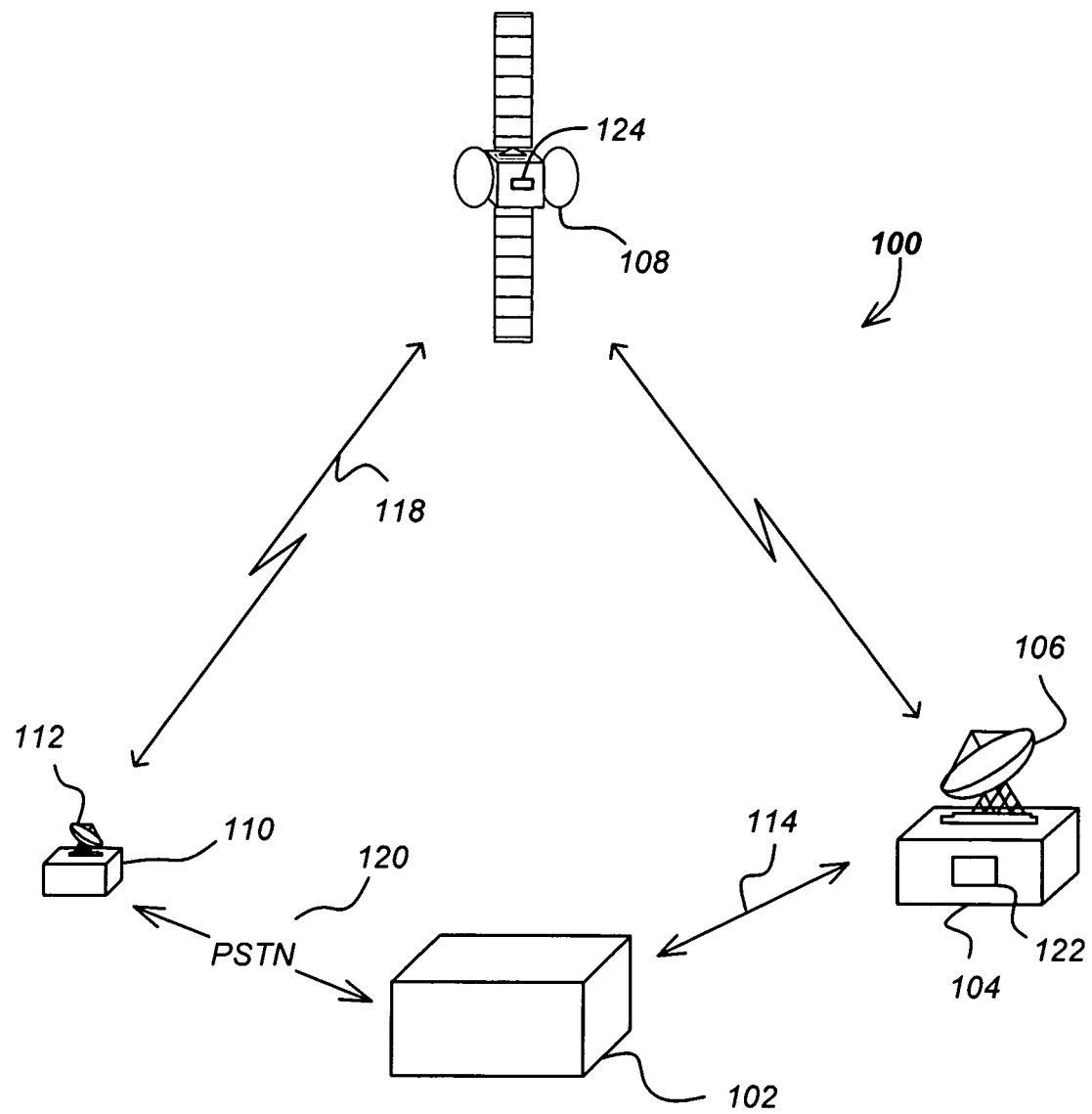
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and with a subscriber 110 via a public switched telephone network (PSTN) or other link 120. The control center 102 provides program material to the uplink center 104, coordinates with the subscribers 110 to offer pay-per-view (PPV) program services, including billing and associated decryption of video programs.

The uplink center receives program material and program control information from the control center 102, and using an uplink antenna 106 and transmitter 122, transmits the program material and program control information to the satellite 108. The satellite receives and processes this information, and transmits the video programs and control information to the subscriber via downlink 118 using transmitter 124. The subscriber 110 receiving station receives this information using the subscriber antenna 112.

In one embodiment, the subscriber antenna 112 is an 18-inch slightly oval-shaped Ku-band antenna. The slight oval shape is due to the 22.5 degree offset feed of the LNB (low noise block converter) which is used to receive signals reflected from the subscriber antenna 112. The offset feed positions the LNB out of the way so it does not block any surface area of the antenna 112 minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention. Although the foregoing has been described with respect to an embodiment in which the program material delivered to the subscriber is video (and audio) program material such as a movie, the foregoing method can be used to deliver program material comprising purely audio information as well.

Uplink Configuration

Figure 2:
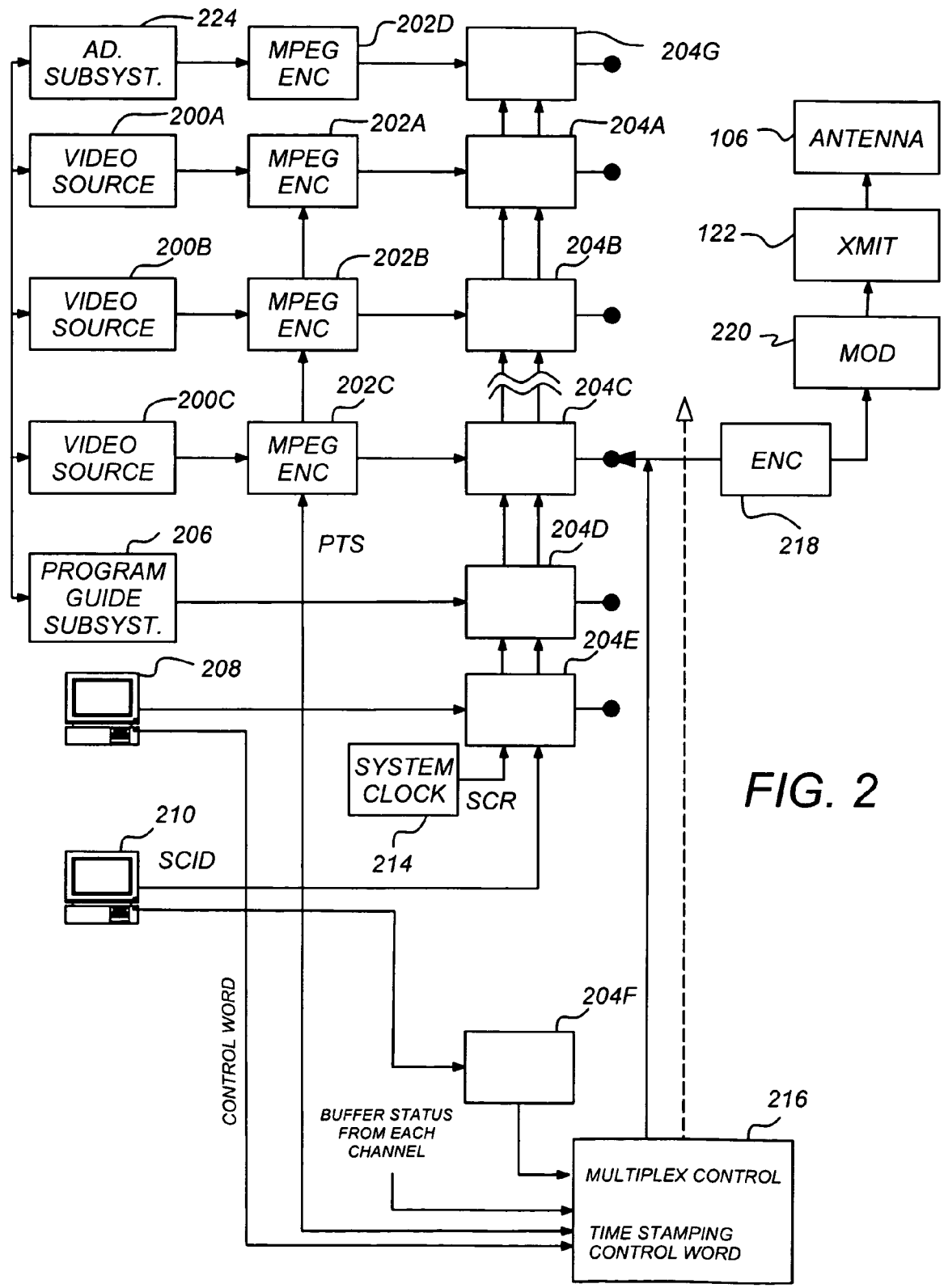
FIG. 2 is a block diagram showing an exemplary uplink configuration including an advertisement subsystem.

FIG. 2 is a block diagram showing an exemplary uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206.

In addition, using the present invention video or data channels can be used to transmit advertisements to be played with programs, depending upon the desired form of the advertisement. A typical advertisement will comprise video data (including associated audio), however, advertisements can also comprise image data, such as still frames or banners with or without associated audio. Furthermore, the invention can be implemented with the advertisements added at video sources 202A-202C (collectively referred to hereinafter as video source(s) 200) or added at the data of the program guide subsystem 206. In one embodiment, an advertisement subsystem 224 can process the advertisements to be transmitted through the uplink, either directly or through the video sources 200 or program guide subsystem 206. In another embodiment, the advertisements can be processed through extended functions of the program guide subsystem 206. Advertisements are processed by applying meta data to the advertisements which will be used to manage presentation of the advertisements.

The video channels are provided by a source of program video material 200A-200C. The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204G (collectively referred to hereinafter as packetizer(s) 204) associated with each source 200.

The data packets are assembled using a reference from the system clock 214 (SCR), and from the conditional access manager 208, which provides the SCID to the packetizers 204 for use in generating the data packets. These data packets are then multiplexed into serial data, encrypted by encryptor 218, modulated by modulator 220, and transmitted.

Advertisement Subsystem

Figure 3A:
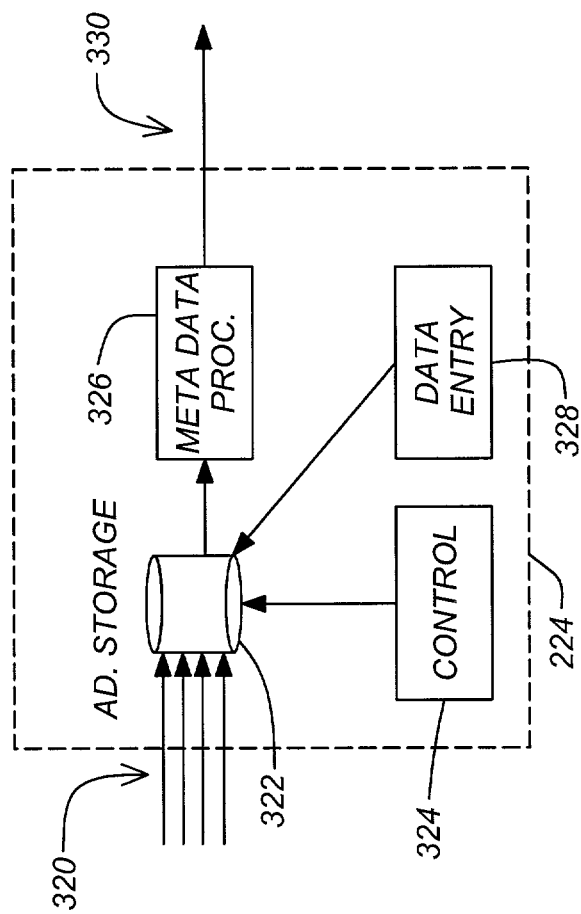
FIG. 3A is a block diagram of an advertisement subsystem used in the present invention.

FIG. 3A is a block diagram of an advertisement subsystem 224 used in the present invention. The advertisement subsystem 224 manages the advertisements to be transmitted to subscribers as previously mentioned. The advertisements are prepared by the subsystem 224 to be delivered to users and appropriately inserted as programs are played. In one embodiment, advertisements are received through links 320 and compiled in an advertisement storage 322. Depending upon the advertisement form, the advertisement storage 322 can be digital, designed to handle video, audio and/or text data or an analog system. The advertisement storage 322 also stores associated information that will be used in tagging the advertisements with meta data. A controller 324 directs sequencing of the advertisements to be delivered through the uplink. As the advertisements are queued for delivery they pass through a meta data processor 326 which formats the advertisement with the applicable meta data. A data entry device 328 can also be used to manually edit the advertisement information in the storage 322 to assist the meta data processing function. The advertisement with meta data is then output through link 330 where the advertisements are applied directly to the uplink datastream through a dedicated packetizer 204G which is given a unique SCID. Again, depending on the data format of the advertisements, a dedicated MPEG encoder 202D may also be employed to encode video data as necessary.

Figure 3B:
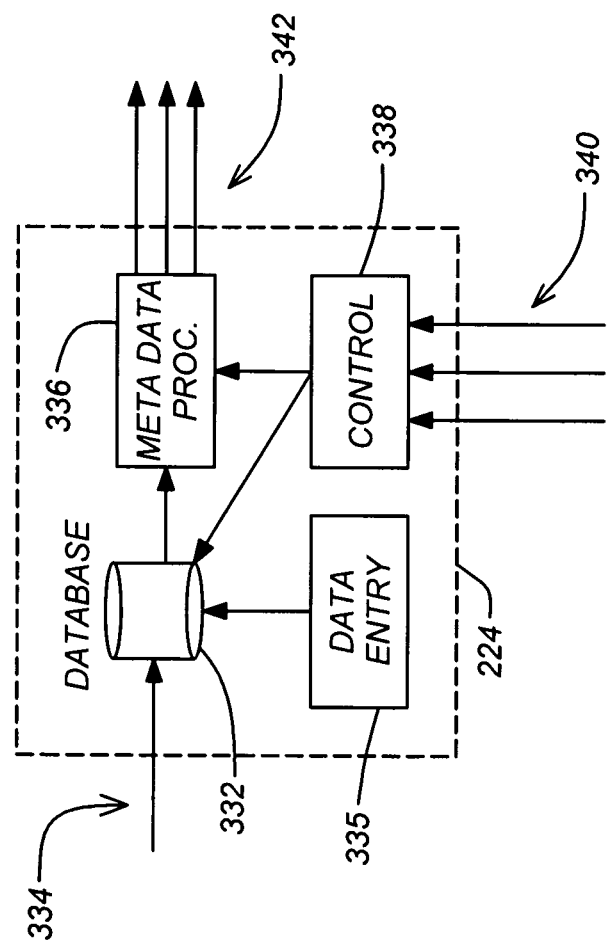
FIG. 3B is a block diagram of an alternate advertisement subsystem used in the present invention.

FIG. 3B is a block diagram of an alternate advertisement subsystem used in the present invention. In this embodiment the advertisement subsystem 224 only handles the information which will be used to generate the meta data. The information is supplied to a database 332 through link 334. Additionally, the information can be further modified in the database 332 through data entry device 335. In this embodiment, the meta data is queued and processed in a meta data processor 336 under the direction of a controller 338. The controller synchronizes processing of the meta data with the advertisements that are being transmitted through the uplink from the video sources 200 and/or the program guide subsystem 206. Synchronization is achieved through one or more input links 340 from the program guide subsystem 206 and/or the video sources 200. The meta data is then applied to the advertisements at their respective source through one or more output links 342. The input and output links 340, 342 can also be consolidated in individual bidirectional communication links.

In yet another embodiment, the advertisement data is incorporated directly into the program guide subsystem 206. Alternately, a separate advertisement subsystem 224 can manage the delivery of advertisements through the uplink. The advertisements can also be inserted from the advertisement subsystem 224 directly in the video data at the video sources 200 or in the data of the program guide subsystem 206. Whether the actual advertisements pass through the subsystem or are placed directly into video sources 200 or the program guide subsystem 206, the advertisement subsystem operates to apply meta data to the advertisements to tag them for later manipulation at the subscriber IRD as will be described hereinafter.

Meta data is added to the advertisements to identify them and facilitate their management at the IRDs. Selective pre-recording and playback can be based upon the meta data. The meta data can comprise various information categories used to enable tracking and management of time shifted advertising. Some examples of meta data content include the advertisement source, duration, type and time position within the program. Typically, the meta data will be added to the advertisements by the advertisement subsystem 224, however, meta data can also be added by the advertisement producer or even by the program guide subsystem 206.

The selection of advertisements to be transmitted can be based upon shared viewer profiles which are communicated to the advertisement subsystem 224 from the various users. Private profiles are used to manage advertisement selection within the individual receivers. The creation of viewer profiles will be detailed hereafter.

Program Guide Subsystem

Figure 3C:
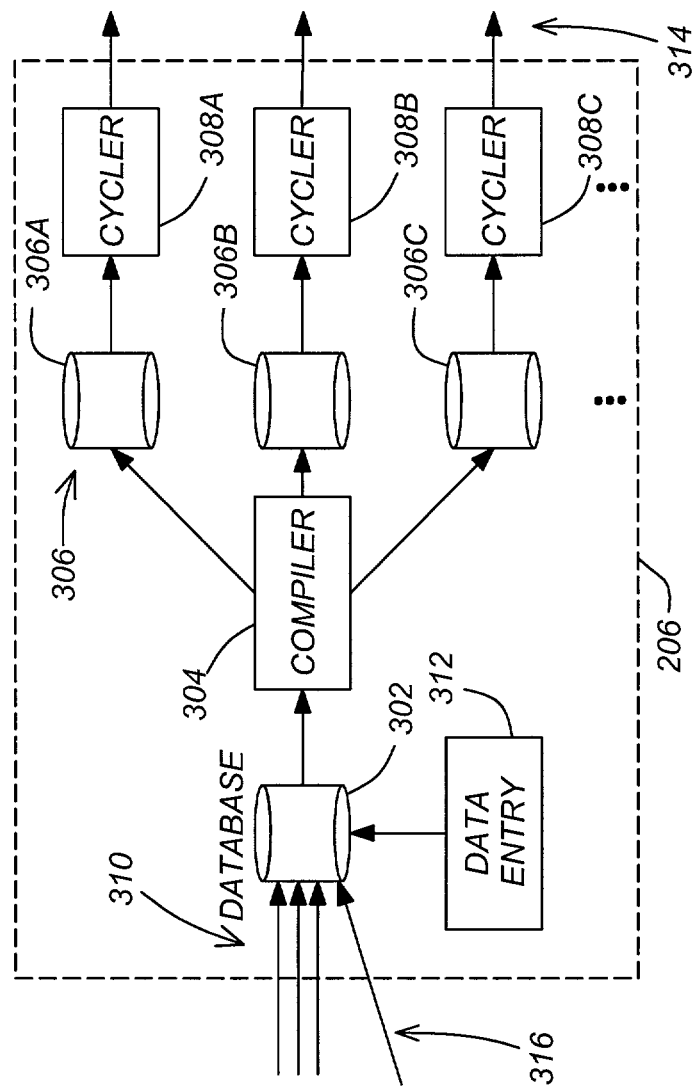
FIG. 3C is a block diagram of a program guide subsystem used in the present invention.

FIG. 3C is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308). In one embodiment of the invention, the program guide subsystem is adapted to facilitate time shifted advertisements.

Schedule feeds 310 provide electronic schedule information about the timing and content of various television channels, such as that found in television schedules contained in newspapers and television guides. Schedule feeds 310 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines to program guide database 302. These companies provide television schedule data for all of the television stations across the nation plus the nationwide channels, such as SHOWTIME, HBO, and the DISNEY CHANNEL. The specific format of the data that are provided by these companies varies from company to company. Program guide database 302 preferably includes schedule data for televisions channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 308. In the case of advertisements, the compiler 304 can be modified to also manage the advertisement delivery through the broadcast system.

Program guide data are also manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 preferably transmits objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown in 12 hours or more. Thus, the program guide objects for the most current programs are sent to a cycler 308 with a high frequency of transmission, while program guide objects for later programs are sent to cyclers 308 with a lower frequency of transmission. All of the objects 314 output by the plurality of cyclers 308 are combined as depicted in FIG. 2.

In addition, because the program schedule subsystem 206 is a computerized database system it is readily adaptable to manage the meta data database as an alternative to a separate advertisement subsystem 224. Thus, the program schedule subsystem 206 can be used to apply meta data to the advertisements. At least one advertisement feed 316 can include advertisement information which will be used by the system to apply meta data to advertisements at the video sources 200. In one embodiment, the advertisements themselves can be delivered through the program guide subsystem 206. These advertisements can typically be limited to only text information to remain compatible with basic program schedule data. Alternately, if the allowable data formats and transfer rates are high enough, the advertisements directed through the program guide subsystem can also comprise video and/or audio data as well.

Broadcast Data Stream Format and Protocol

FIG. 4A is a diagram of a representative data stream comprising a series of packet segments or data packets. The first packet segment 402 comprises information from video channel 1 (data coming from, for example, the first video program source 200A). The next packet segment 404 comprises advertisement data that was obtained, for example from the meta data processor 326 of the advertisement subsystem 224. The next packet segment 406 comprises information from video channel 5 (from one of the video program sources 200). The next packet segment 408 comprises program guide information such as the information provided by the program guide subsystem 206. As discussed, this packet segment 408 can also comprise an advertisement including meta data. Next, a null packet segment 410 is placed in the data stream. Null packets created by the null packet module 212 may be inserted into the data stream as desired. The following packet segments 412, 414, and 416 comprise, respectively, audio information from channel 1, video information from channel 1 and audio information from channel 2.

The data stream therefore comprises a series of data packets 402, 404, 406, 408, 410, 412, 414, and 416 from any one of the data sources in an order determined by the controller 224. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

FIG. 4B is a diagram of an individual data packet. Each data packet (e.g. 402, 404, 406, 408, 410, 412, 414, and 416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 200. The final packet segment 426 is data required to perform forward error correction.

Integrated Receiver/Decoder

Figure 5:
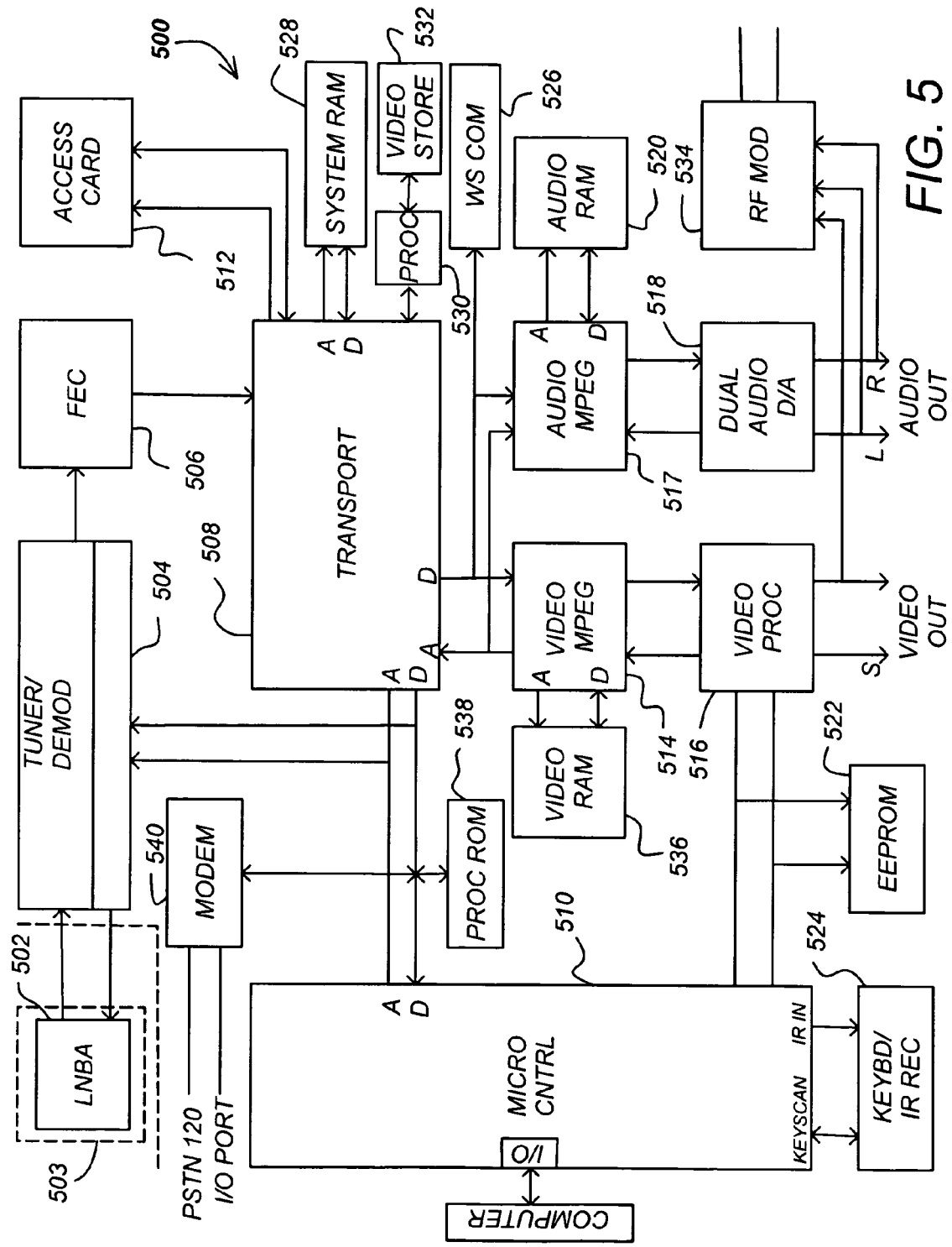
FIG. 5 is a block diagram of an integrated receiver/decoder and a video storage device for practicing the present invention.

FIG. 5 is a block diagram of an integrated receiver/decoder (IRD) 500 (also hereinafter alternatively referred to as receiver 500). The receiver 500 comprises a tuner/demodulator 504 communicatively coupled to an outdoor unit (ODU) 503 comprising an antenna (e.g. antenna 112) having one or more low noise block converters (LNB) 502. The LNB 502 converts the 12.2 to 12.7 GHz downlink 118 signal from the satellites 108 to, e.g., a 950-1450 MHz signal required by the receiver's 500 tuner/demodulator 504. The LNB 502 may provide either a dual or a single output. The single-output LNB 502 has only one RF connector, while the dual output LNB 502 has two RF output connectors and can be used to feed a second receiver or some other form of distribution system.

The tuner/demodulator 504 isolates a single, digitally modulated 24 MHz transponder, and converts the modulated data to a digital data stream. The digital data stream is then supplied to a forward error correction (FEC) decoder 506. This allows the receiver 500 to reassemble the data transmitted by the uplink center 104 (which applied the forward error correction to the desired signal before transmission to the subscriber 110) verify that the correct data signal was received, and correct errors, if any. The error-corrected data may be fed from the FEC decoder module 506 to the transport module via an 8-bit parallel interface.

Using system RAM 528, the transport module 508 performs many of the data processing functions performed by the receiver 500. The transport module 508 processes data received from the FEC decoder module 506 and provides the processed data to the video MPEG decoder 514 and the audio MPEG decoder 516. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 516. As set forth more fully hereinafter, the transport module also works with the access card 512 to determine whether the subscriber 110 is permitted to access certain program material. Data from the transport module can also be supplied to external communication module 526.

The access card 512 functions in association with other elements to decode an encrypted signal from the transport module 508. The access card 512 may also be used for tracking and billing these services. In one embodiment of the present invention, the access card is a smart card, having contacts cooperatively interacting with contacts in the receiver 500 to pass information. In order to implement the processing performed in the access card 512, the receiver 500, and specifically the transport module 508 provides a clock signal to the access card 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 517 using the audio RAM 520. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example multi-channel digital audio formats, such as DOLBY DIGITAL AC-3.

A description of the processes performed in the encoding and decoding of video streams, particularly with respect to MPEG and JPEG encoding/decoding, can be found in Chapter 8 of "Digital Television Fundamentals", by Michael Robin and Michel Poulin, McGraw-Hill, 1998, which is hereby incorporated by reference herein.

Microcontroller 510 receives and processes command signals from the remote control 524, a receiver 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the receiver 500 via address and data lines (denoted "A" and "D" respectively, in FIG. 2).

The modem 540 connects to the customer's phone line via the PSTN port 120. It calls e.g. the program provider and transmits the customer's program purchases for billing purposes, and/or other information. The modem 540 is controlled by the microprocessor 510. The modem 540 can output data to other I/O port types including standard parallel and serial computer I/O ports.

The video processing module 516 output can be directly supplied as a video output to a viewing device such as a video or computer monitor. In addition the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the receiver 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map the channel numbers to satellite transponders and service channel identifications (SCIDs), and also provide TV program listing information to the subscriber identifying program events.

Video Storage Device

The present invention also comprises a local storage unit such as the video storage device 532 for storing video and/or audio data obtained from the transport module 508. Video storage device 532 can be a hard disk drive, a read/writable compact disc of DVD, a solid state RAM, or any other storage medium. The storage device can be integrated into the IRD or function in a stand alone unit as a personal video recorder (PVR) In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

Time Shifted Advertising

Figure 6:
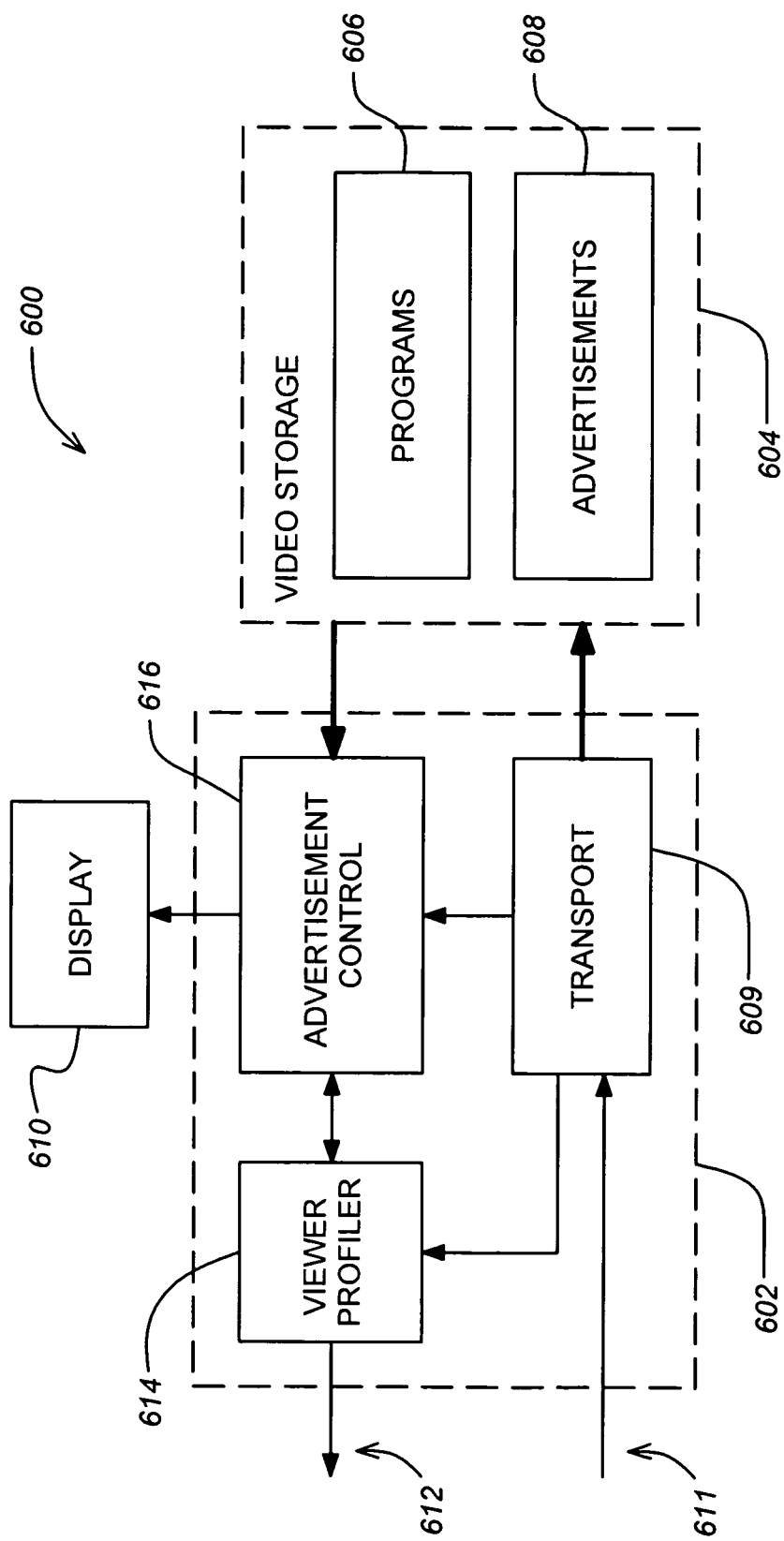
FIG. 6 is an exemplary video system implementing time shifted advertising.

FIG. 6 is an exemplary video system 600 implementing time shifted advertising. The system uses the meta data applied to the advertisements at the uplink center to manage viewing of the advertisements at the user's location. The system 600 elements include a video source such as a receiver 602 (e.g. receiver 500) which supplies the programs and advertisements to the system 600, a video storage device 604 which stores the programs 606 and advertisements 608 and a display 610 for viewing the video data. Within the receiver 602, a video transport 609 (such as transport 508) controls data processing of the receiver and directs received video from input 611 to be stored on the storage device or displayed on the display 610.

A viewer profiler 614 operates within the receiver 602 to monitor and record general viewing habits of the viewer. The profiler 614 is a programmable device which determines a viewer profile within the receiver 602 based upon a private viewing history. Because the viewer profile is determined within the individual receiver 602 and not at a central information collection center, privacy of the user is maintained. The targeting profiles can account for household demographic data supplied into profiler 614 from the service provider or even input directly by the viewer. The profiler 614 can also track whether particular advertisements have already been viewed (or how often they have been viewed) and incorporate this information into the stored viewer profile.

The profiler 614 distinguishes between shared viewing history and viewer information and private viewing history and viewer information. In this way there are effectively, if not literally, two profiles for a given user, a shared profile and a private profile, the fundamental difference being the amount of information applied in creating each. The shared profile is essentially generated from a subset of the data (e.g. viewing history and viewer information) used in generating the private profile. All advertisement selection within the receiver 602 is based upon the private (i.e. complete) profile, while advertisement selection elsewhere (e.g. at the service provider) is based upon the shared (i.e. subset) profile. The level of privacy (i.e. the amount of shared information) can be effectively selected by a user. The advertisers and service providers may also offer incentives, for example in the form of discounts of prizes, to promote more shared information. In addition, the viewer profiler can store more than one viewer profile so that a single receiver can be operated in a personalized manner for multiple users.

In general it may be determined that the viewing history of advertisement is always shareable (while program viewing history is not necessarily shareable). In this case, when a viewing is reported back the advertisers can then pay for advertising based directly upon the number of times their advertisements are viewed. Presumably, these viewings are more valuable to them than those provided via traditional broadcast because they are targeted by the profiler 614 operating within the receiver 602.

The meta data on incoming advertisement is read by the advertisement control 616 and checked for compatibility with the formed profile. In this way the meta data functions as a label on the advertisement 608 (although it may contain multiple descriptive categories) and does not directly mandate the inclusion of its associated advertisement 608. The advertisement control 616, stored within the home receiver 602, makes the determination to include a particular advertisement 608 based upon the viewer profile.

The advertisement control 616 processor selects advertisements 608 to be included from the video storage device 604 based, in part, upon both input from the viewer profiler 614 and the meta data of available advertisements 606 in the storage device 604. The advertisements 608 are appropriately inserted as a program is also played to the display 610, either from the storage device 604 or directly from the transport 608 as the program is received. The advertisement control 616 operates as a real-time video editor, directed by information from the viewer profiler as well as direct selections from the viewer in some instances. The functions of the viewer profiler 614 as well as advertisement control 616 can alternately be delegated to a general processor within the receiver 602 (such as the microcontroller 510) or embodied on a dedicated processor(s).

In addition, the accumulated shareable information from the viewer profiler 614 regarding viewing habits can be optionally reported back from the receiver 602 via an output 612 (such as the PSTN I/O port 120). The private viewing history and viewer information is not reported back (although it is still used in formulating the resulting viewer profile). Using this shared information, the service provider and/or advertisers can improve future advertisements by providing more advertising focused on predilections of viewers.

Although the system 600 is described comprising three large separate components, the receiver 602, the video storage device 604 and the display 606, it is not necessary to maintain separate devices. For example, the invention can be implemented as a receiver unit which includes a built in video storage device or even a single unit which includes all three components. In addition, the advertisement control processor and/or the viewer profiler can alternately be included with the video storage device 604 instead of the receiver 602.

Figure 7:
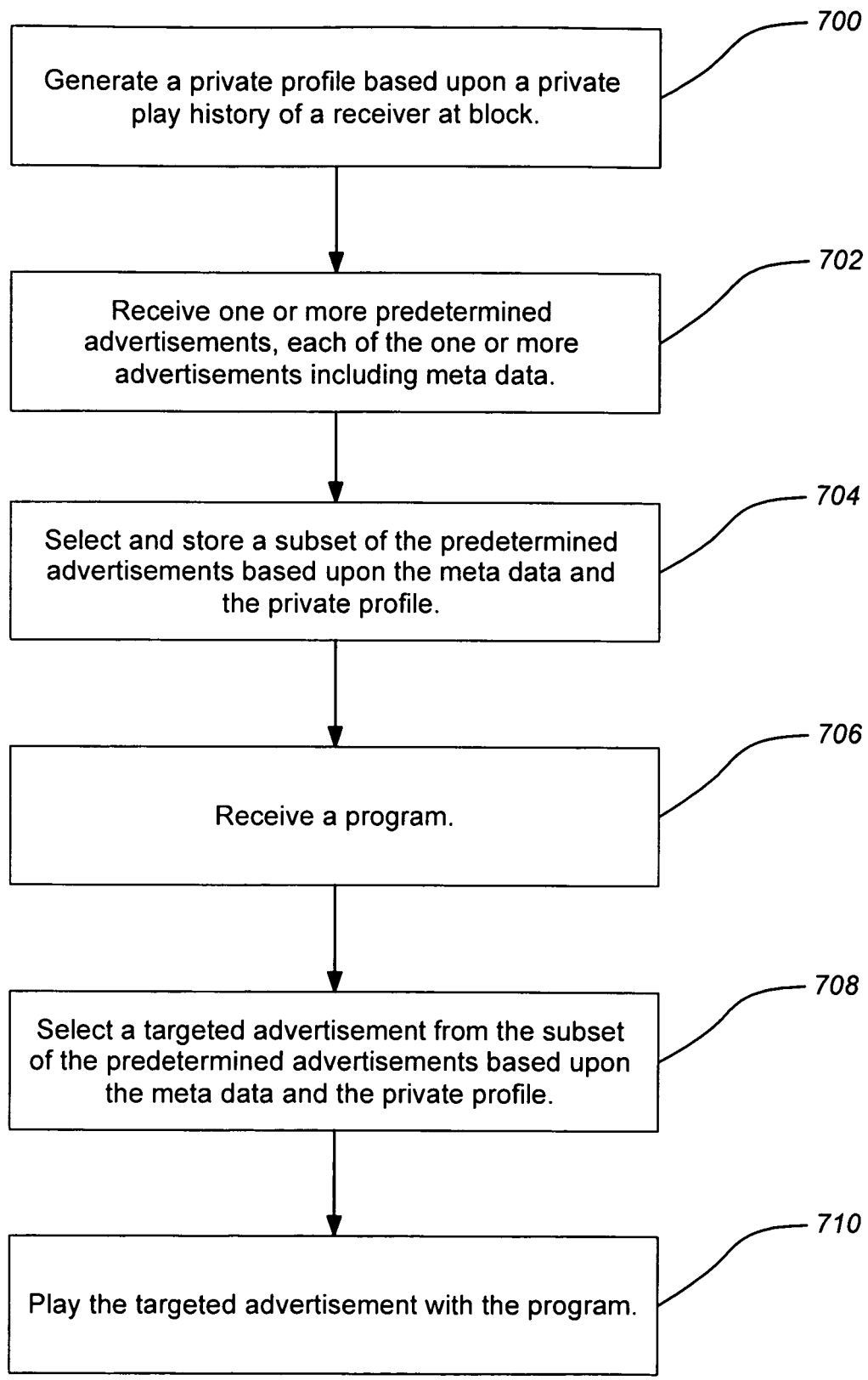
FIG. 7 is a flowchart of a method of time shifted advertising using the present invention.

FIG. 7 is a flowchart of a basic method of time shifted advertising using the present invention. The basic method of time shifting advertising of a video service comprises generating a private profile based upon a private play history of a receiver at block 700. Next, one or more predetermined advertisements are received at block 702, each of the one or more advertisements including meta data. A subset of the predetermined advertisements is selected and stored based upon the meta data and the private profile at block 704. A program is received at block 706 and a targeted advertisement is selected from the subset of the predetermined advertisements based upon the meta data and the private profile at block 708. Finally, the targeted advertisement is played with the program at block 710. A number of different detailed embodiments can encompass selective playback of advertisements. Some examples are detailed hereafter.

Many detailed processes employing the present invention can be implemented within the foregoing architecture to deliver advertising in many different embodiments. The invention enables novel exhibition opportunities for programming. The invention also provides for daypart inventory shifting of advertising and recording spots off air for later use. The invention enables multi-tiering of advertising inventory. The invention also allows time shifted playback and time shifted promotion.

1. User Selected Advertisements

The invention enables user selections to determine whether certain advertisements are played. For example, pricing for pay-per-view programs can be based upon a user's consent to view an offered advertisement. A pay-per-view movie for viewing without advertising is offered at one price and the same movie for viewing with advertising is offered at a second discounted price. The advertisement, stored in the video storage device 604, can take the form of a commercial (such as a trailer for an upcoming movie) targeted to the viewers' tastes by profiler 614 routines. The viewer watches the targeted commercial prior to the start of the paid-for feature program. In addition, information of the selection of the advertisement-added movie can be collected by the profiler 614 and reported back to assist in future targeted advertising. User selections related to pricing represent shared profile information. Essentially, viewing the advertisement can be tracked by merely tracking who paid the discounted price, an inherently shared event.

2. Time Shifting To Retarget Advertising

When programs are recorded using conventional video recorders, advertisements are recorded with them. However, as discussed in the background, advertisements are targeted to demographics identified by when programs are watched. Therefore, advertisements recorded and watched at another time are mistargeted. This represents a loss of efficiency to advertisers. By allowing advertisements to be retargeted and appropriately based upon when a program is viewed, the invention presents a source for new advertising fee structures. This is a benefit and functionality separable from targeting based upon the viewer profiler 614 (although profiling certainly enhances targeting).

This function can be handled by providing a time stamp in the meta data. The advertisement control 616 selects from the stored advertisements for one with a time stamp that matches the current time. The selected advertisement (targeted by daypart) is played with the program.

Using the invention, advertisements and promotions can be arranged by the time of day the recorded program is played back from the video storage device 604. If the user records a scheduled program along with its attendant advertisements during a particular period (e.g. the day time daypart), a new set of advertisements can be presented with the program from the video storage device 604 when it is played. In addition, the advertisements can be additionally targeted specifically to the customer by the profiler 614. As before, the system can also report back to the service provider whether the event (advertising or promotion) was actually viewed.

3. Advertisement/Program Frequency and Staged Advertisements

The invention also provides a system and method for different sets of advertisements to be inserted, based upon the number of times the program or advertisement is replayed from the video storage device 604. Again, these advertisements and promotions can be specifically targeted to the viewer. Advertisement control 616 can determine which advertisement is played, based upon the history of played advertisements. A number of useful embodiments inure from tracking advertisement frequency.

For example, traditionally the only way advertisers could be sure that their ads were viewed by receptive consumers was to saturate many programs with numerous airings of their advertisement. However, with the invention, advertisers can specify exactly how many of the advertisements viewed by receptive consumers will be their advertisements. To the advertiser the value (and therefore the price that they are willing to pay) is the same because the overall effect will be the same. However, now different advertisements can also be directed to other viewers who would have been unreceptive to the first advertisements. Thus, the invention creates new advertising revenue and improves aggregate advertising efficiency by minimizing advertising time otherwise wasted presenting advertisements to unreceptive consumers.

Tracking the history of advertisements also enables advertisements to be specifically staged for the viewer. For example, an advertiser can create a set of advertisements intended to be played in a particular sequence and reasonably close in time so the viewer follows the progression. The invention can enable the proper viewing order even if the program is changed. This advertising format can be used to create a more lasting impression on the consumer.

In addition, advertising spot (i.e. avail) inventory contained in an individual program can be resold based on the number of times a program is retrieved from the video storage device 604. For example, a media buying service might offer individual spots within a program to multiple advertising clients with a price structure based upon the number of times that a user views the program. The number of times viewed is reported back to the service provider. The value of the spot on a first viewing compared to that of a spot for a subsequent viewing would be similar to pricing used in marketing spots contained in a premier program as compared to a rerun.

Finally, the ability to report back, not only the number of times that an advertisement and/or program was actually viewed, but also when and how it was viewed by the customer (e.g. time of day, day of week, complementary or adjacent programming viewed, etc.) provides added value to the service provider and advertiser in targeting future content to the customer and scheduling programming.

4. Background Advertisement Recording

The invention can also use the video storage device 604 as a repository of stored advertisements which can be loaded even when the receiver 602 is not being operated by the user. The selected advertisements are downloaded to the video storage device 604 at some point prior to airing of the program. The advertisements can then be tagged with meta data based on criteria established by the service provider or advertiser. This enables a novel category of advertising of regionally targeted national advertising. For example, General Motors could buy a thirty second national spot in the NBC program, The West Wing, and arrange with NBC to allow for the "roll in" or covering of the nationally broadcast GM ad with other regionally targeted GM product ads for various car models. In preparation, these ads are archived on all regional IRD video storage devices 604s and are triggered individually from within each IRD based on customer specific targeting profiles and advertiser specific criteria when the show airs.

Advertiser criteria can include regional product availability and regional preferences and other criteria based upon regional distinctions. Again, actual viewing of the advertisement can be reported back to assist in program scheduling and targeting future advertisements.

5. Advertisement Expiration

The invention can also allow the insertion of a promotion targeted according to the day that the recorded program is played back from the video storage device 604. This can be used to eliminate irrelevant advertising. For example, during a normal program broadcast on Monday night, the program might contain a promotion related to another program that airs the following Tuesday night. However, if the program is recorded to the video storage device 604 and played back on Wednesday night, it would be pointless to view the advertisement. The present invention allows expiration periods to be assigned to advertisements in the meta data that will allow the advertisement control 616 to screen them out in favor of a meaningful advertisement.

CONCLUSION

This concludes the description including the preferred embodiments of the present invention. The foregoing description including the preferred embodiment of the invention has been presented for the purposes of illustration and description. It is not intended to be exhaustive or to limit the invention to the precise form disclosed. Many equivalent modifications and variations are possible in light of the above teaching.

It is intended that the scope of the invention be limited not by this detailed description, but rather by the claims appended hereto. The above specification, examples and information provide a complete description of the manufacture and use of the apparatus and method of the invention. Since many embodiments of the invention can be made without departing from the scope of the invention, the invention resides in the claims hereinafter appended.

What is claimed is:

1. A method of time shifting advertising of a video service, comprising the steps of:
generating a private profile for a viewer based upon private play history of a receiver associated with the viewer;
generating a shared profile for the viewer in the receiver based upon a shared play history of the receiver and a user-selected level of privacy;
transmitting the shared profile to a service provider;
receiving one or more predetermined advertisements, each of the one or more advertisements including meta data, and each of the received one or more predetermined advertisements being selected based on the shared profile;
selecting and storing a subset of the predetermined advertisements in the receiver based upon the meta data and the private profile;
receiving a program from the service provider;
storing the received program in a video storage device;
accepting a command to replay the stored program;
selecting a targeted advertisement from the stored subset of the predetermined advertisements based upon the meta data and the private profile, wherein selecting the targeted advertisement is based upon one or more previous replays of the stored program; and
replaying stored program with the targeted advertisement.

2. The method of claim 1, wherein playing the targeted advertisement is based upon a viewer election to view the targeted advertisement.

3. The method of claim 2, wherein the viewer election is based upon pricing of the program.

4. The method of claim 1, further comprising reporting a status of the playing of the targeted advertisement and wherein an advertising price is based on the reported status.

5. The method of claim 1, wherein the meta data comprises information categories selected from the group comprising an advertisement source, duration, type and time position, a regional identifier and an expiration within the program.

6. The method of claim 1, wherein the meta data comprises a regional identifier and selecting and storing the subset is based upon a regional identifier.

7. The method of claim 1, wherein the meta data comprises an expiration of the targeted advertisement and selecting the targeted advertisement is based upon the expiration.

8. The method of claim 1, wherein selecting the targeted advertisement is based upon a time of day that the program is played.

9. An apparatus for time shifting advertising of a video service, comprising:

a profiler for generating a private profile for a viewer based upon a private play history of a receiver associated with the viewer, for generating a shared profile based on a shared play history of the receiver and a shared play history of the receiver and a user-selected level of privacy, and for reporting the shared profile to a service provider;

a receiver, communicatively coupled to the profiler, for receiving one or more predetermined advertisements, each of the one or more advertisements including meta data, and for receiving a program from the service provider, and each of the received one or more predetermined advertisements being selected for transmission based on the shared profile;

an advertisement controller, communicatively coupled to the profiler, for selecting and storing a subset of the predetermined advertisements based upon the meta data and the private profile and selecting a targeted advertisement from the stored subset of the predetermined advertisements based upon the meta data and the private profile, wherein the advertisement controller selects the targeted advertisement based upon one or more previous replays of the program;

a video storage device, communicatively coupled to the advertisement controller, for storing the selected subset of the predetermined advertisements and for storing the received program; and a transport, communicatively coupled to the advertisement controller and the profiler for replaying the stored program with the targeted advertisement.

10. The apparatus of claim 9, wherein the transport replays the targeted advertisement with the stored program based upon a viewer election to view the targeted advertisement.

11. The apparatus of claim 10, wherein the viewer election is based upon pricing of the program.

12. The apparatus of claim 9, wherein the advertisement controller reports a status of the playing of the targeted advertisement and wherein an advertising price is based on the reported status.

13. The apparatus of claim 9, wherein the meta data comprises information categories selected from the group comprising an advertisement source, duration, type and time position, a regional identifier and an expiration within the program.

14. The apparatus of claim 9, wherein the meta data comprises a regional identifier and the advertisement controller selects and stores the subset based upon a regional identifier.

15. The apparatus of claim 9, wherein the meta data comprises an expiration of the targeted advertisement and the advertisement controller selects the targeted advertisement based upon the expiration.

16. The apparatus of claim 9, wherein the advertisement controller selects the targeted advertisement based upon a time of day that the program is played.

17. The apparatus of claim 9, wherein the program is received and played in real time.

18. The apparatus of claim 9, wherein the program is recorded and played from the recording.

* * * * *